(12) United States Patent
Darnault et al.

(10) Patent No.: US 6,484,024 B1
(45) Date of Patent: Nov. 19, 2002

(54) METHOD FOR THE PROGRAMMING OF AN INSTRUMENT, ESPECIALLY A MOBILE TELEPHONE

(75) Inventors: Patrick Darnault, Cergy Pontoise (FR); Laurent Marjollet, Gadancourt (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/434,407

(22) Filed: Nov. 4, 1999

(30) Foreign Application Priority Data

Nov. 5, 1998 (FR) .............................. 98 14107

(51) Int. Cl.[7] .............................................. H04M 3/00
(52) U.S. Cl. ........................................ 455/418; 455/558
(58) Field of Search ................................. 455/558, 418, 455/420, 410, 411, 414, 557

(56) References Cited

U.S. PATENT DOCUMENTS 5,418,837 A * 5/1995 Johansson et al. ............. 379/58
5,497,411 A * 3/1996 Pellerin ........................ 379/59
5,884,168 A * 3/1999 Kolev et al. ................. 455/432
6,223,026 B1 * 4/2001 Martschitsch ............... 455/407
6,311,241 B1 * 10/2001 Hofmann .................... 710/102

FOREIGN PATENT DOCUMENTS

WO      WO 98/23114      5/1998

* cited by examiner

Primary Examiner—Edward F. Urban
Assistant Examiner—Naghmeh Mehrpour
(74) Attorney, Agent, or Firm—Nilles & Nilles, S.C.

(57) ABSTRACT

To facilitate the customization of instruments, especially mobile telephones whose operation is validated by a chip card, it is planned to use a cargo chip card provided in its memory firstly with complementary function elements and, secondly, with unloading units. As and when the functions are unloaded into the mobile telephone, the units are obliterated. It is shown that in this way the distribution of the services is organized in a simple manner in preventing piracy on the one hand and complicated procedures on the other.

12 Claims, 2 Drawing Sheets

METHOD FOR THE PROGRAMMING OF AN INSTRUMENT, ESPECIALLY A MOBILE TELEPHONE

BACKGROUND OF THE INVENTION

1. Field of the Invention

An object of the present invention is a method for the programming of an instrument, especially a mobile telephone. The aim of the invention is to simplify an updating of mobile telephone programs while enabling the commercial distribution, with recorded accounting, of new services made available to users with their mobile telephones. More generally, the invention relates to the programming of any instrument whose operation is conditioned by the presence of a chip card, especially a chip card to validate its operation. In this respect, the invention relates more particularly to mobile instruments even though this is not necessarily so.

2. Description of the Prior Art

GSM type mobile telephones work with chip cards or with chip tokens that are detachable and are inserted into a reader contained in a package of the mobile telephone. This chip card is called an SIM or secure identification module card. One of the essential functions of these chip cards is to ensure that the mobile telephone is used by its real owner. Indeed, when the mobile telephone is put into service, namely when it is powered on, there is a process comprising the recognition of a secret code known to the owner of the mobile telephone. The secret code is compared in the chip card with a secret code contained by it. In the event of coincidence, the operation of the mobile telephone is permitted. Otherwise, it is prohibited.

As other functions, the chip card has that of memorizing different items of information on its bearer, especially information on a subscription with a mobile telephony operator. Consequently, with a system of this kind, any user is able to exchange his mobile telephone for another one because he deems it to be obsolete or for any other reason. He can then make this other telephone work without difficulty by inserting his subscription chip card therein. The identification of subscriptions stored in the chip card will preferably but not compulsorily relate to the series number of the chip, a secret code associated with the recognition algorithm, a telephone number at which the subscriber can be reached, as well as a subscriber number called an IMSI (these two numbers could be one and the same number) or any other piece of information.

A mobile telephone and, in general, a piece of equipment capable of working under the control of a chip card comprises a data-processing system similar to that of a microcomputer, although certain functions can be more specialized. A computer system of a mobile telephone essentially comprises a program memory and a data memory linked with a microprocessor. The program memory comprises all the programs that the mobile telephone can be made to perform. The data memory generally comprises the series number of the mobile telephone as well as different data elements proper to the user. Among the pieces of data proper to the user, there is the known example of directory data: the user can store his preferred telephone numbers in a directory of this kind. In general, such a directory is associated with an automatic keying-in function. The program memory therefore comprises a sub-program to perform this automatic keying-in function. There are other known functions. For example, there is the hands-free function in which, at the user's request, a loudspeaker of the mobile telephone sends amplified sounds so that they can be heard, if necessary, by several persons without its being necessary to hold the mobile telephone close to the ear. It is also possible to provide the mobile telephone with a diary function, calculator function and so on.

The process of making these functions available has several particular aspects. First of all, the new functions can be prepared as and when they occur in time. They can even be improved from a first version to a following version. It is then important that users who do not have this function or have an older version of it should be provided with a new function, the most recent one which, in principle, is the most powerful one. Furthermore, the storage of all these functions in a program memory of a mobile telephone means that this memory will be large in size. Given the limits of capacity encountered in certain cases, it may be necessary to make choices, for example by giving priority to one function over another function which will be absent. Thirdly, even when this technical limitation is not present, it is possible to consider depreciating the cost of devising these functions by selling their utility to mobile telephone users. For example, when taking out a subscription, or purchasing a mobile telephone, a user may be able, for an extra charge, to subscribe to other options in the operation of his mobile telephone.

In any case, when the choice is made, the final problem that arises is that of the effective programming of the working of the mobile telephone as a function of the wishes expressed by the user. To arrive at this result, it is possible to connect the mobile telephone by its base connector to a holder with a multiple-pin connector. The holder is furthermore connected to a piece of equipment such as a microcomputer. The microcomputer is used for the loading into the program memory of the mobile telephone of all the functions that a user might wish. Otherwise, it may be planned to remote-load all the functions to which the user may subscribe into the program memory, using RF means.

In the former case, fairly complex equipment is needed. This runs counter to the possibility of fast sales. Furthermore, a mobile telephone operator cannot be certain that the retailer who does this programming will not offer functions as he wishes to all the clients of his choosing without informing the operator about it. In this case, the marketing of the services will be unprofitable, since the intermediate retailer will be encouraged to achieve his own business objectives by offering additional functions as gifts.

In the latter approach with remote loading, it should at least be possible for a communication to be set up. Now a communication such as this is set up only for mobile telephones, not for any unspecified instruments. In addition, for a mobile telephone, the communication is set up only when the subscription has been is made. Furthermore, the use of a remote-loading operation of this kind makes it difficult to account separately for the amounts due by the user and the amounts due by the retailer. In principle, everything is invoiced to the user. This means that it is not really possible for the retailer to adopt a strategy of offering incentives. All the subscribed functions will be automatically invoiced. The retailer no longer has the possibility of offering discounts.

One approach to overcome these problems could consist of the loading into the SIM card that makes the mobile telephone work of all the functions to which the user can subscribe. An approach of this kind nevertheless comes up against several problems. If it is sought to set up a program that is specific to a user and at the same time a check (for the mobile telephone operator) the process of making the different functions available, then a problem of real-time updating will come up. At present, a real-time updating of this kind is nevertheless indispensable. Furthermore, in a SIM card, the memory size is limited. Indeed, a card of this kind must have a program memory responsible for performing all the security functions. The program pertaining to this security function is already large. There does not really remain any space for the storage therein of all the sub-programs that can be envisaged.

To resolve this problem, in the invention it is planned to act in a way that is quite original. It is planned temporarily to replace the SIM card of the mobile telephone by a bulk carrier card, hereinafter be called a cargo card, containing the sub-programs that correspond to the options to be made available to the user. In a preferred case, the cargo card comprises all the options that can be made available to the user. When this cargo card is introduced into the mobile telephone or into the instrument, because it carries the options only, the mobile telephone or instrument launches a program for unloading the contents of this cargo card into the memories of the mobile telephone. In one improvement, this unloading is done under control in such a way that the user and/or the intermediary retailer can select and validate the options that they wish to place in the mobile telephone.

In another improvement, as and when the options are unloaded by the retailer into the mobile telephones, units are wiped out from the cargo card in such a way that the counting-out of the services made available is done with precision (i.e., during an unloading of the instruction elements in an instrument, the number of unloading operations is counted in the cargo chip card). If necessary, a counting-out operation of this kind can be done service type by service type. When a cargo card is empty, the intermediary retailer must refill his card from the mobile telephony operator in order to be able to offer services again.

This procedure naturally means doing away with the need for a complex piece of equipment such as a microcomputer associated with a specific connector. Indeed, such a method uses a connector already present in the mobile telephone, namely the connector used to read the SIM card.

Furthermore, the problem of memory size is settled because, in the cargo card, firstly the entire memory can be devoted to the functions to be unloaded. Secondly, in one improvement of the invention, instead of loading the program instructions, it is keys for unlatching the sub-programs that will be loaded. These keys will already be present in a general program contained in the memory of the mobile telephone and enabling the implementation of the desired function. These keys are not as bulky as the instructions of the programs themselves and can therefore be stored in larger numbers in a memory reduced to a chip card.

SUMMARY OF THE INVENTION

An object of the invention therefore is a method for the programming of an instrument wherein:
instructions to be performed by this instrument are stored in a program memory of the instrument,
wherein the method comprises the following steps:
  instruction elements to be executed are recorded in a cargo chip card,
  a step of unloading these instruction elements coming from a chip card reader of the instrument is recorded in a program for resetting the instrument,
  the cargo chip card is placed in the instrument,
  the resetting program is used to activate the unloading of the instruction elements,
  and the instructions are then executed by means of these instruction elements.

BRIEF DESCRIPTION OF THE DRAWINGS

The invention will be understood more clearly from the following description and from the appended figures. These figures are given purely by way of an indication and in no way restrict the scope of the invention. Of these figures.

MORE DETAILED DESCRIPTION

Figure 1:
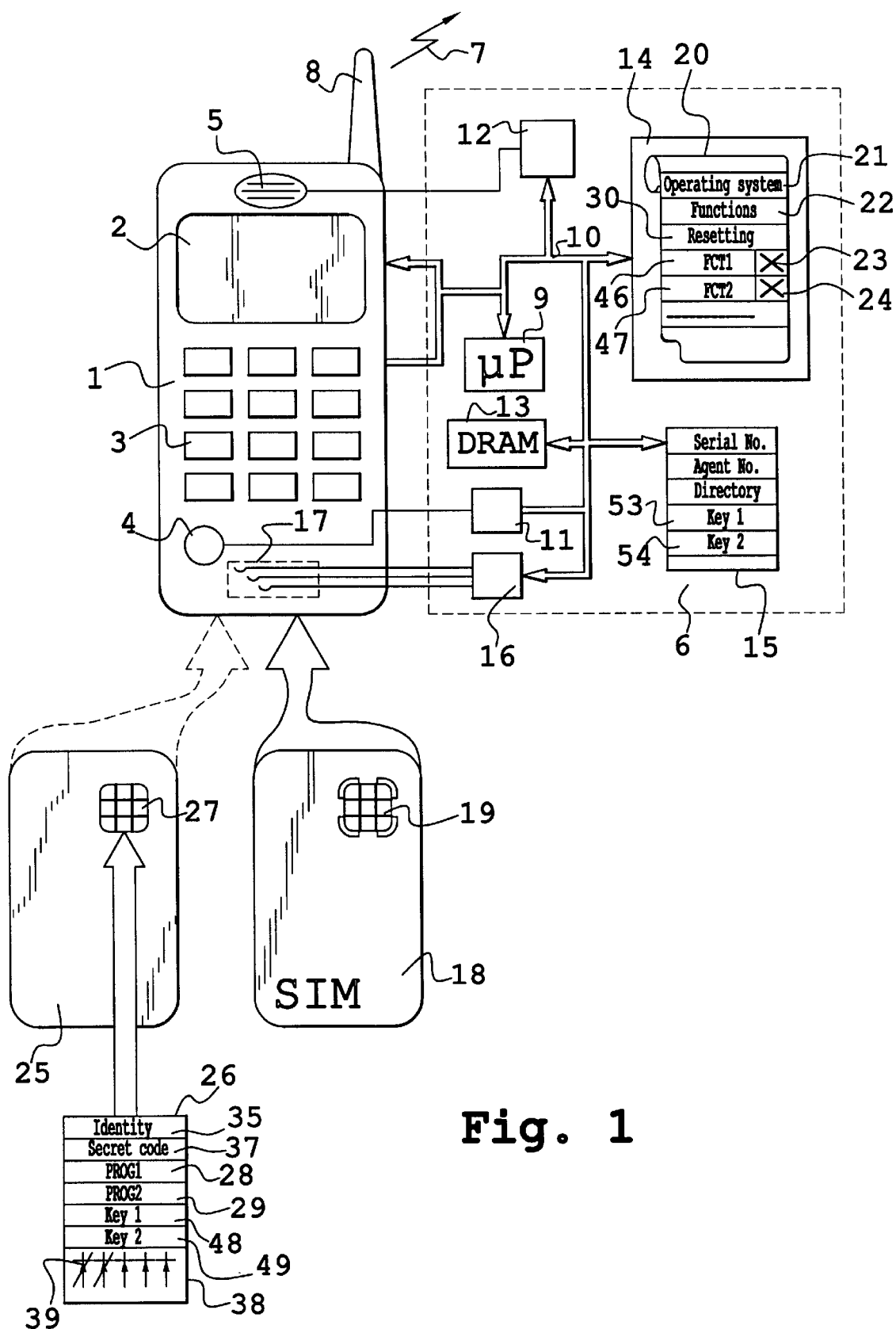
FIG. 1 gives a schematic view of a mobile telephone, a SIM chip card and a cargo chip card according to the invention to implement the method of the invention.

FIG. 1 shows a mobile telephone that can be used as an instrument, which is mobile in the preferred mode, to implement the method of the invention. This mobile telephone in a known way comprises a pack 1 holding a screen 2 and control buttons 3. It also has elements not visible in the drawing, namely a microphone 4 and a loudspeaker 5 linked with an electronic circuit 6 internal to the mobile telephone. The circuit 6 enables the mobile telephone to exchange RF communications 7 by means of a broadcasting antenna 8. The electronic circuit 6 has a microprocessor 9 linked by a bus 10 to speech processing circuits 11 for the processing of the speech uttered by a user and speech restitution circuits 12 connected to the loudspeaker 5. The bus 10 is still linked with a working memory 13, a program memory 14, and a data memory 15. Finally, in the context of a GSM type telephone or more generally an instrument, whether mobile or not, with chip card controlled operation, the bus 11 is linked with an interface circuit 16 connected to a chip-card reader 17. The mobile telephone may include many other pieces of equipment, especially the base connector referred to here above.

To function, such a instrument requires the introduction of a validation chip card. In the context of mobile telephones, the validation chip card 18 is what is known as a SIM card provided with a connector 19 adapted to work together with the reader 17. An electronic circuit not shown therein is associated with the connector 19. This electronic circuit is of the same type as the circuit 6 and comprises especially a microprocessor. Above all, in its program memory, it has authentication programs to allow the mobile telephone to be operated only by its genuine bearer, namely the bearer who is able to key in a secret code with the buttons 3 when he or she puts the mobile telephone into operation.

A program 20 contained in the program memory 14 comprises at least one operating system 21 as well as certain routine functions 22. These functions are the functions of transmission, reception and speech processing that are indispensable to the mobile telephone. The aim of the invention is to place sub-programs in the invention relating to additional functions FCT1, FCT2, etc. that are optional and marketable. In the invention, these functions FCT1, FCT2, etc. do not initially take an executable form in the program 20. They are not in executable form either because they are not present at all or because they are present but clamped by means of latches 23 and 24.

The method used by the invention to memorize or at least activate the additional functions to be used consist in removing the SIM chip card 18 (which is indispensable for the working of the mobile telephone) and replacing it by a cargo chip card 25 that is used only to convey functions to be incorporated into the program memory 20. Preferably, this transposition of the chip cards will be done by first of all stopping the mobile telephone and starting it again. The cargo chip card 25 then comprises, in its memory 26 connected to its connector 27, instruction elements 28 and 29 corresponding to the functions FCT1 and FCT2 etc. to be made available to users.

To prompt the unloading of the instruction elements 28–29 into the memory 20 of the mobile telephone, the program 20 is then provided with a sub-program 30 for the unloading of these instruction elements coming from the chip card reader 17. Preferably, this unloading sub-program 30 will be a resetting sub-program. Indeed, to remove the chip card 18 and replace it by the chip card 25, it is preferable to perform these replacements when the instrument is powered off. This makes it possible to avoid the possibility of short circuits or electric shocks. Furthermore, a replacement of this kind in which the instrument is turned off is an operation that is intuitively accepted by the different participants. In principle, it is not indispensable. However it is far more practical. Consequently, when the mobile telephone is put back into service after the cargo card 25 has been inserted therein, the unloading program of the invention will naturally be included in a resetting program 30 of the mobile telephone and will comprise this additional step according to the invention. In the present application, the term <resetting program> therefore refers to unloading, whether the unloading is done when the instrument is started up or not. Thus, the instruction elements 28 and 29 get unloaded and placed either in the dynamic working memory 13 or in the non-volatile memory 14. Subsequently, it is possible to perform the instructions corresponding to the functions FCT1, FCT2, etc. This execution however is possible only by replacing the cargo card 25 by the SIM card 18 if need be by resetting the mobile telephone a second time.

Figure 2:
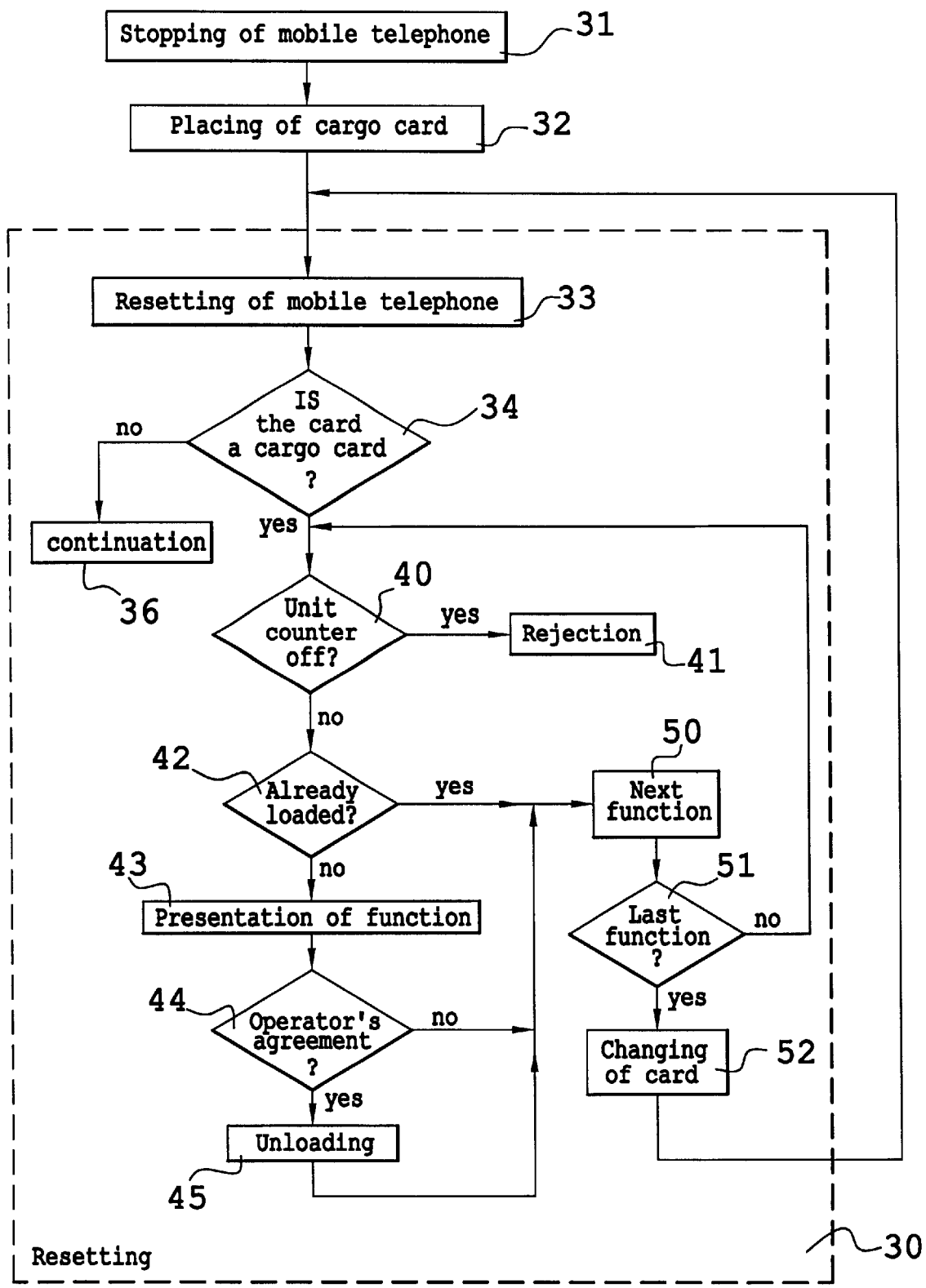
FIG. 2 shows a flow chart of the operations to be performed to implement the method of the invention.

FIG. 2 gives a detailed view of the different steps of the method of the invention thus shown in the context of an application to a mobile telephone.

During a first step 31, the mobile telephone is thus stopped. In practice, this stopping is specific and amounts only to placing the instrument on hold. In the invention, this stopping will preferably comprise only the neutralization of the interface 16 so as to prevent short circuits on the reader 17. This placing of the mobile phone on hold will not necessarily comprise any refreshing of the volatile memory 13. Preferably, this placing of the mobile telephone on hold will be done while keeping the battery in operation precisely so as to preserve the contents especially of this volatile memory 13. In this way, the functionality of the mobile telephone is maintained.

During a subsequent operation 32, the chip card 18 is replaced in the reader 17 by the cargo chip card 25. During a following operation 33, the mobile telephone is reset by launching the sub-program 30. In fact, it is essentially the unloading of the instruction elements 28 and 29 of the card 25 in the memory 20 that will be activated. This could be done by providing for a sequence with the control buttons 3 so that, despite the removal of the chip card 18, there will be a continued maintenance of authorization to function, corresponding to the session put into operation beforehand, and so that only the unloading operations themselves are launched. Preferably however, as indicated here above, this unloading operation will be prompted by an operation for resetting of the mobile telephone.

This resetting operation begins with a reading 34 of the contents of the card 25 present in the reader 17 to ascertain that it is a cargo card. To this end, this card comprises a piece of identity information 35 in a predetermined memory location, for example at the address at the very beginning of the memory 26. This piece of identity information 35 enables the unloading program to ascertain that the card before the reader 17 is a cargo card. If this is not the case (as usually happens when such a cargo card is not present), the sequence 36 of the program 20–30 occurs normally and leads to the known use of the mobile telephone. If the card is a cargo card, the resetting program 30 could possibly include a sequence of verification and authentication by which a secret code 37 stored in the card 25 will be compared with a secret code expected by the sub-program 30. In order to enter the unloading operations in a system of accounting, the memory 26 of the cargo card 25 will be provided with a recording 38 comprising a certain number of units 39. These units may be in an obliterated state or an available state. During a step 40 that follows the step 34, the program 30 ascertains that the recording 38 still contains available units 39. If it no longer comprises such units, it will be assumed that the unit counter is off. The program 30 will then prompt the display on the screen 2 of a piece of rejection information 41 informing the operator that the user credit of the cargo card 25 is fully depleted. Preferably, the piece of information 41 will request the operator to replace the cargo card 25 by the initial SIM card or by another card.

If there are remaining units, the program 30, in the course of a test 42, reads the first recording of an additional function 28 that is present in the memory 26. These additional function recordings may thus be stored, with numbers, in the memory 26 or, if they have variable lengths, they may each comprise a starting address and an arrival address. During the test 42 which will be repeated hereinafter, it is thus possible at each time to know when a following reading operation must begin. The test 42 is also designed to ascertain that the function whose elements have just been picked up in the region 28 of the memory 26 is no longer present in the program memory 14. As the case may be, this presence will be verified with respect to a version for the updating of the function present in the memory 14.

If the function is not present, it is proposed during an operation 43 at the unloading in the memory 14. The operation 43 thus comprises the reading, at the beginning of the recording 28, of a title of the function and the display of this title on the screen 2. Subsequently, the program 30 gives the user the possibility, during an instruction 44, of prompting or not prompting the unloading of the option presented. In this case, the customer signifies assent or refusal. And in the event of assent, there is an unloading 45 proper of the instruction elements 28 corresponding to the displayed program.

This unloading may take several forms. In a simple form, the instruction elements 28 comprise an entire sub-program that can be used, in the context of the program 20, to constitute the implementation of a function FCT1. In this case, the unloading operation 45 comprises the copying in the memory 14 of the corresponding instructions in executable form. As the case may be, if the memory space 26 of the cargo card is limited, the instruction elements 26 will be present in the form of a source sub-program. The unloading operation will then comprise a compilation of source instructions to load corresponding executable instructions into the program 20.

Preferably however, the problem of the restricted size of the memory 26 of the cargo card 25 will be resolved in other ways. In this way, this cargo card could itself be a low-cost chip card containing few memory words. In this preferred mode, the program 20 already comprises (in executable form), instructions 46 to 47 corresponding to the functions FCT1, FCT2, etc. However, the recordings pertaining to these functions are associated with latch memory zones 23 and 24 seen here above. In this case, instead of the storage of program elements contained in the zones 28 and 29 of the memory 26, the unloading operation will comprise the unlatching of the latches 23 and 24 by means of keys 48 and 49 contained in the memory 26.

According to the invention, the instruction elements are therefore either source instructions or executable instructions or keys.

In the last mode of operation, when the mobile telephone is put into normal service, the program 20 reads the titles of all the functions available in the sub-programs of this program 20. However, the only ones that it presents in a menu usable by the user are those for which a latch 23 or 24 has been unlatched by means of a key 48 or 49. Thus, only the functions whose sub-programs are released can be executed by the mobile telephone.

The operation of releasing the latches 23 and 24 is preferably performed under conditions of security similar to those of the reading and authentication of the secret code 37. The operating system 21 comprises sets of instructions needed to carry out these verifications efficiently. In the prior art, it is known that it is possible, with 512-bit keys, to obtain sufficient security.

Naturally, the unloading operations will preferably be accompanied by the obliteration of one of the units 39 of the recording 38.

The operation 45 as well as the test 44, if negative, are followed by the continuation 50 of the reading of the contents of the cargo card 25. During a test 51 after this continuation step, it is ascertained that the previously read function was or was not the last. If it was not the last, there is a return to the test 40 and the rest of the operations are repeated as seen here above. In this case, in a single operation, the retailer may unload as many functions as have been commercially agreed upon into the user's mobile telephone. When all the functions have been reviewed, the test 51 leads to an operation 52 during which the retailer again transposes the chip cards so as to place the SIM card again in the mobile telephone. Thus, the cost of transferring the options is borne by the retailer. He is free to invoice the user for these options or include them in a more comprehensive transaction. In any case, the interests of the mobile telephony operator and of the mobile telephone manufacturer are protected.

The last change of the chip card can be done, like the previous one, by making the mobile telephone stop (without disconnecting of the battery so as to maintain the integrity of the dynamic memory 13). During the reinsertion of the SIM card 18, the keys KEY 1 and KEY 2 for the unlatching of the latches 23 and 24 may be present in the dynamic memory 13. In this case, the unloading option will be usable only for one session, until the mobile telephone is turned off. An option of this kind may relate to operations that have to be performed only once. For example it may be a operation to change the telephone number of this subscriber. It may also be a modification of the subscription terms. In this case, after having performed the operation corresponding to the unloaded function, the retailer will stop the mobile telephone, if necessary by disconnecting the battery before reconnecting it so that it is no longer possible to undertake any other modification of the same type.

On the contrary, if the unloaded functions have to be made available permanently to the user, the keys KEY 1 and KEY 2 of the zones 48 and 49 of the memory 26 will be registered in the recordings 53 and 54 of the non-volatile data memory 15. Then, in addition to the usual information pertaining to series number, subscriber number and directory proper to the subscriber, this memory will contain keys corresponding to the use of the additional functions 46 and 47 latched by latches 23 and 24.

As a variant, it may be planned that the reader 17 will be a double reader, and the interface circuit will alternately put into service one of the two readers related respectively with either the SIM card 18 or the cargo card 25.

The embodiment thus described enables any intermediary to program a mobile telephone at request without having any specific equipment available, and, at the same time, keep precise and careful accounts of the services proposed to customers. To this end, the recording 38 could be duplicated into as many different recordings as there are different functions or keys to be unloaded. If need be, this recording 38 will be used only to count the number of unloading operations for statistical purposes. Once the card 25 is unusable because its units 39 have all been obliterated, it can be discarded. If there are several counters, it will preferably be recycled so that unused units are taken into account. The unused cards are then returned to the operator of the mobile telephone who can set up statistics on the relative utility and interest of each of the functions undergone.

What is claimed is:

1. A method for the programming of an instrument wherein:
   instructions to be performed by this instrument are stored in a program memory of the instrument,
   wherein the method comprises the following steps:
   instruction elements to be executed are recorded in a cargo chip card,
   a step of unloading these instruction elements coming from a chip card reader of the instrument is recorded in a program for resetting the instrument,
   the cargo chip card is placed in the instrument,
   the resetting program is used to activate the unloading of the instruction elements,
   the instructions are then executed by means of these instruction elements,
   instructions to be executed by the instrument are stored in a program memory of the instrument in latched form, and
   keys for the unlatching of the latched stored instructions are unloaded into the cargo chip card.

2. A method for the programming of an instrument wherein:
   instructions to be performed by this instrument are stored in a program memory of the iustrument,
   wherein the method comprises the following steps:
   instruction elements to be executed are recorded in a cargo chip card,
   a step of unloading these instruction elements coming from a chip card reader of the instrument is recorded in a program for resetting the instrument,
   the cargo chip card is placed in the instrument,
   the resetting program is used to activate the unloading of the instruction elements,
   the instructions are then executed by means of these instruction elements,
   instructions to be executed by the instrument are stored in a program memory of the instrument in latched form, and
   keys for the unlatching of the latched stored instructions are unloaded from the cargo chip card.

3. The method of claim 2 further including the step of counting the number of unloading operations during an unloading of the instruction elements in the instrument.

4. The method of claim 2, wherein:
the resetting program is activated in an operation for putting the instrument into service.

5. The method of claim 2, wherein:
in the resetting program, a test is performed to find out if the chip card linked with the reader is a cargo chip whose contents must be unloaded, and
if necessary, a test is performed to find out if the cargo chip card has already been unloaded into the program memory of the instrument.

6. The method of claim 2, wherein:
to use the unloaded instructions, the instrument is reset.

7. The method of claim 3, wherein:
the number of unloading operations are counted in the cargo chip during an unloading of the instruction elements in the instrument.

8. The method of claim 2, wherein:
the instructions are recorded in a volatile memory of the instrument.

9. The method of claim 2, wherein:
the instructions are recorded in a non-volatile memory of the instrument.

10. The method of claim 2, wherein:
at the time of the unloading, an intermediary is asked to take action in order to confirm the loading options.

11. The method of claim 2, further including the step of providing a double card reader in the instrument for reading the chip card and the cargo chip card.

12. The method of claim 2, wherein the instruction elements are selected from the group including source instructions, executable instructions, and keys.

* * * * *